United States Patent [19]

Cavitt et al.

[11] Patent Number: 4,544,731

[45] Date of Patent: Oct. 1, 1985

[54] METHOD FOR PREPARING ADVANCED EPOXY RESINS

[75] Inventors: Michael B. Cavitt, Lake Jackson; David J. Duncan, Freeport, both of Tex.

[73] Assignee: The Dow Chemical Company, Midland, Mich.

[21] Appl. No.: 689,417

[22] Filed: Jan. 7, 1985

[51] Int. Cl.$^4$ .................. C08G 59/14; C08G 59/62
[52] U.S. Cl. ........................ 528/89; 528/88; 528/90; 528/102; 528/104
[58] Field of Search ............ 528/88, 89, 90, 102, 528/104

[56] References Cited

U.S. PATENT DOCUMENTS

| | | | |
|---|---|---|---|
| 3,350,353 | 10/1967 | Alvey | 528/104 X |
| 3,424,725 | 1/1969 | Fischer et al. | 260/73 |
| 4,302,574 | 11/1981 | Doorakian et al. | 528/89 |
| 4,310,688 | 1/1982 | Mendoza | 560/222 |
| 4,354,015 | 10/1982 | Doorakian et al. | 528/104 X |
| 4,358,578 | 11/1982 | Brownscombe | 528/104 X |
| 4,394,497 | 7/1983 | Nelson et al. | 528/104 X |

*Primary Examiner*—Earl Nielsen
*Attorney, Agent, or Firm*—J. G. Carter

[57] ABSTRACT

The increase in hydrolyzable halide content in the preparation of advanced epoxy resins is decreased by conducting the advancement in the presence of an unsaturated organic compound.

12 Claims, No Drawings

METHOD FOR PREPARING ADVANCED EPOXY RESINS

BACKGROUND OF THE INVENTION

The present invention pertains to an improved process for preparing relatively high molecular weight epoxy resins by advancing relatively low molecular weight epoxy resins with a polyhydric phenol.

One method for preparing relatively high molecular weight epoxy resins is to react a relatively low molecular weight epoxy resin with a polyhydric phenol. The relatively low molecular weight epoxy resin usually contains a small quantity of hydrolyzable halide. During the advancement reaction, an increase in hydrolyzable halide content is observed. Also noticed is that the epoxide equivalent weight of the advanced epoxy resin tends to increase while the advanced epoxy resin is being held at elevated temperatures awaiting further processing such as, for example, flaking and/or transfer to storage vessels and the like.

The present invention tends to eliminate or reduce the increase in hydrolyzable halide content during the advancement reaction and/or reduce the increase in epoxide equivalent weight (EEW) of the resultant advanced epoxy resin held at elevated temperature while awaiting further processing.

SUMMARY OF THE INVENTION

The present invention pertains to an improvement in a process for preparing relatively high molecular weight epoxy resins by reacting at least one relatively low molecular weight epoxy resin with at least one polyhydric phenolic compound in the presence of a suitable advancement catalyst; wherein the improvement comprises conducting the advancement reaction in the presence of an effective amount of at least one organic unsaturated compound so as to decrease the hydrolyzable halide content in the resultant relatively high molecular weight epoxy resin and/or prevent increases in EEW of the advanced epoxy resin while held at elevated temperature.

DETAILED DESCRIPTION OF THE INVENTION

Suitable epoxy resins which can be employed herein include, for example, the diglycidyl ethers of dihydric phenols, the diglycidyl ethers of dihydric alcohols, mixtures thereof and the like.

Particularly suitable diglycidyl ethers of dihydric phenols include, for example, the diglycidyl ethers of resorcinol, catechol, hydroquinone, dihydroxybiphenyl, bisphenol A, bisphenol F, bisphenol S, bisphenol K, mixtures thereof and the like. Also suitable are the halogenated derivatives of the aforementioned diglycidyl ethers of polyhydric phenols such as, for example, the diglycidyl ether of tetrabromobisphenol A. Other inert substituents can also be present such as alkoxy groups, alkyl groups and the like.

Particularly suitable diglycidyl ethers of aliphatic alcohols include, for example, the diglycidyl ethers of propylene glycol, dipropylene glycol, polyoxypropylene glycols, butylene glycol, dibutylene glycol, polyoxybutylene glycols, polyoxyethylene glycols, cyclohexane dimethanol, dicyclopentadiene dimethanol, triglycidyl ethers of 1,1,1-tris(hydroxymethyl)ethane, 1,2,3-trihydroxypropane, mixtures thereof and the like.

Also, if desired, small quantities of polyglycidyl ethers of polyhydric phenols having greater than about two phenolic hydroxyl groups per molecule can be employed such as, for example, the glycidyl ethers of phenol-aldehyde novolac resins, trisphenols and the like. These polyglycidyl ethers having more than 2 glycidyl ether groups per molecule are employed in quantities which do not produce a gelled product when the mixture of glycidyl ethers are advanced with dihydric phenols.

Suitable polyhydric phenols which can be employed herein include, for example, resorcinol, catechol, hydroquinone, dihydroxybiphenyl, bisphenol A, bisphenol F, bisphenol K, bisphenol S, mixtures thereof and the like. Also suitable are the halogenated derivatives of the aforementioned polyhydric phenols such as, for example, tetrabromobisphenol A and the like. Other inert substituents can also be present such as alkoxy groups, alkyl groups and the like.

Suitable unsaturated organic compounds include, for example, unsaturated aliphatic hydrocarbons, unsaturated cycloaliphatic, aromatic hydrocarbons having unsaturated aliphatic hydrocarbon substituents, unsaturated alcohols, unsaturated ketones, unsaturated carboxylic acids and anhydrides thereof, esters of unsaturated carboxylic acids, unsaturated sulfides, unsaturated mercaptans, unsaturated ethers, unsaturated nitriles, mixtures thereof and the like.

Suitable unsaturated aliphatic hydrocarbons include olefins and diolefins and acetylenic compounds having from 2 to about 40 carbon atoms such as, for example, propene, butene, butyne, pentene, pentyne, hexene, hexyne, butadiene, mixtures thereof and the like. Cycloaliphatic and polycycloaliphatic unsaturated hydrocarbons such as, for example, cyclohexene, dicyclopentadiene, cyclooctadiene, limonene, norbornene, 5-vinyl-2-norbornene, methyl dicyclopentadiene, mixtures thereof and the like.

Suitable unsaturated alcohols include, unsaturated aliphatic alcohols having from about 3 to about 40 carbon atoms such as, for example, 3-hexene-1,2-diol, 4-hexene-1,2-diol, 5-hexene-1,2-diol, 1-hexene-3-ol, 2-hexene-1-ol, 3-hexene-1-ol, 3-hexyne-1,2-diol, 3-hexyne-2,5-diol, 1-hexyne-3-ol, 3-butene-1,2-diol, 1-butene-3-ol, mixtures thereof and the like.

Suitable unsaturated ketones and/or aldehydes include those having from about 4 to about 40 carbon atoms such as, for example, 4-hexene-3-one, 5-hexene-2-one, 4-pentene-2-one, vinyl acetophenone, acrolein, methylacrolein, crotonaldehyde, cinnamaldehyde, mixtures thereof and the like.

Suitable unsaturated carboxylic acids and anhydrides thereof include those having from about 3 to about 40 carbon atoms such as, for example, 2-propenoic acid, 2-butenoic acid, 3-butenoic acid, 2-pentenoic acid, 2-hexenoic acid, 3-hexenoic acid, 4-hexenoic acid, 5-hexenoic acid, 2-butenedioic acid, 3-hexenedioic acid, linolenic acid, linoleic acid, vinyl benzoic acid, acrylic acid, methacrylic acid, cinnamic acid, α-methyl cinnamic acid, oleic acid, mixtures thereof and the like.

Suitable esters of unsaturated carboxylic acids include those having from about 4 to about 40 carbon atoms such as, for example, ethylacrylate, propyl acrylate, butyl acrylate, pentyl acrylate, hexyl acrylate, dicyclopentadiene acrylate, dicyclopentadiene alkoxy acrylate, 1,6-hexanediol diacrylate, allyl methacrylate, mixtures thereof and the like.

Suitable unsaturated ethers include those having from about 3 to about 40 carbon atoms such as, for example, allyl ether, allyl phenyl ether, isopropenyl phenyl ether, mixtures thereof and the like.

Suitable unsaturated nitriles include those having from about 3 to about 40 carbon atoms such as, for example, 3-butenonitrile, 5-hexenitrile, 5-hexynenitrile, allyl isocyanate, allyl isothiocyanate, mixtures thereof and the like.

Suitable unsaturated sulfides include those having from about 3 to about 40 carbon atoms such as, for example, allyl methyl sulfide, allyl sulfide, mixtures thereof and the like.

Suitable unsaturated mercaptans include those having from about 3 to about 40 carbon atoms such as, for example, allyl mercaptan, hexene mercaptan, mixtures thereof and the like.

Suitable aromatic compounds having unsaturated aliphatic hydrocarbon substituents include those having from about 7 to about 50 carbon atoms, such as, for example, allyl phenol, 4-allyl-2,6-dimethoxy phenol, isopropenyl phenol, dimer of isopropenyl phenol, 2-allyl-4-methyl phenol, 2-allyl-2-methoxy phenol, vinyl anisole, vinyl biphenyl, 2-vinyl naphthalene, styrene, $\alpha$-methyl styrene, t-butyl styrene, chlorostyrene, vinyl toluene, cinnamyl alcohol, vinyl pyridine, mixtures thereof and the like.

The amount of unsaturated compound varies from time to time depending on the conditions employed, but is usually from about 0.001 to about 0.007, preferably from about 0.002 to about 0.006 moles of unsaturated compound per epoxide equivalent contained in the initial resin.

Suitable advancement catalysts include, for example, tertiary amines, imidazoles, phosphonium compounds, quaternary ammonium compounds, sulfonium compounds, LiOH, mixtures thereof and the like.

Suitable quaternary ammonium compounds include, for example, benzyl trimethyl ammonium chloride, benzyl trimethyl ammonium hydroxide, tetrabutyl ammonium chloride, tetramethyl ammonium hydroxide, tetrabutyl ammonium hydroxide, mixtures thereof and the like.

Suitable tertiary amines include, for example, diethylenetriamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium catalysts include, for example, ethyltriphenylphosphonium acetate, ethyltriphenylphosphonium diacetate (ethyltriphenylphosphonium acetate.acetic acid complex), ethyltriphenylphosphonium chloride, ethyltriphenylphosphonium bromide, ethyltriphenylphosphonium iodide, ethyltriphenylphosphonium dihydrogenphosphate, ethyltriphenylphosphonium oxalate, tetrabutylphosphonium acetate, tetrabutylphosphonium diacetate (tetrabutylphosphonium acetate.acetic acid complex), tetrabutylphosphonium chloride, tetrabutylphosphonium bromide, tetrabutylphosphonium iodide, tetrabutylphosphonium dihydrogenphosphate, tetrabutylphosphonium oxalate, mixtures thereof and the like. These and other phosphonium compounds are disclosed by Dante et al in U.S. Pat. No. 3,477,990; Perry in Canadian Pat. No. 893,191 and U.S. Pat. No. 3,948,855; and by Tyler, Jr. et al in U.S. Pat. No. 4,366,295 all of which are incorporated herein by reference.

The quantity of advancement catalyst is, depending upon the conditions employed, usually from about 0.0003 to about 0.01, preferably from about 0.0005 to about 0.001 mole of catalyst per epoxide equivalent.

The process of the present invention is conveniently conducted at temperatures of from about 100° C. to about 210° C., preferably from about 110° C. to about 190° C. for a period of time to reach the desired degree of epoxy-phenolic reaction.

The following examples are illustrative of the invention.

The following components were employed in the examples.

Catalyst was a 70 weight percent solution of ethyltriphenyl phosphonium acetate.acetic acid complex in methanol.

Epoxy Resin A was a diglycidyl ether of bisphenol A having an average EEW of 185.0 and an average hydrolyzable chloride content of 51 ppm.

Epoxy Resin B was a diglycidyl ether of bisphenol A having an average EEW of 190.9 and an average hydrolyzable chloride content of 92 ppm.

PROCEDURE FOR DETERMINING HYDROLYZABLE CHLORIDE (HyCl) CONTENT

To a 250 ml Erlenmeyer flask was added, in order, 0.5 to 2.0 g of epoxy resin sample weighing to the nearest 0.001 g, 20 ml of acetone and 20 ml of toluene and then stirred until the epoxy resin was dissolved. Alcoholic potassium hydroxide (0.1 N) was added to the resin solution in the amount of 50 ml and then refluxed for 15 minutes (900 s) using a water cooled condenser. After cooling to ambient temperature, bromocresol green indicator was added (6–7 drops) and then made acidic using nitric acid (6–20 drops of 35% acid or until the solution turned yellow). The sample was then titrated using 0.0025N silver nitrate in methanol to a potentiometric end point using a Metrohm-Herisau automatic titrator.

The HyCl content was calculated as follows:

$$\text{ppm HyCl} = \frac{(\text{ml sample} - \text{ml blank})(0.0025)(35500)}{\text{sample weight}}$$

The blank was determined as the procedure above with the exception that resin was not added.

COMPARATIVE EXPERIMENT A

A 1-liter flask was charged in order with 581.7 g (3.144 epoxy equivalents) of epoxy resin A, 168.3 g (0.738 mole) of bisphenol A and then heated to 90° C., whereupon 0.77 g (0.0013 mole) of catalyst was added. A nitrogen purge was maintained for the duration of the reaction. The reaction temperature was increased to about 130° C. and maintained until the reaction was completed or about 0.95 hr. (3420 s). The resultant product had a 493 EEW and a hydrolyzable chloride content of 125 ppm.

EXAMPLE 1

A 0.5-liter flask was charged in order with 232.68 g (1.258 epoxy equivalents) of epoxy resin A, 67.32 g (0.295 mole) of bisphenol A and then heated to 90° C. whereupon, 1.35 g (0.005 mole) of 44.6 weight percent solution of maleic acid in methanol then 0.45 g (0.0008 mole) of catalyst was added. A nitrogen purge was maintained for the duration of the reaction. The reaction temperature was increased to about 130° C. and maintained until the reaction was completed or about 0.98 hr. (3540 s). The resultant product had a 495 EEW and 72 ppm hydrolyzable chloride content.

COMPARATIVE EXPERIMENT B

A 1-liter flask was charged in order with 470.84 g (2.466 epoxy equivalents) of epoxy resin B, 129.16 g (0.566 mole) of bisphenol A and then heated to about 90° C., whereupon 0.83 g (0.0014 mole) of catalyst was added. A nitrogen purge was maintained for the duration of the reaction. The reaction temperature was increased to about 150° C. and maintained until the reaction was completed or about 1.02 hrs. (3672 s). The resultant product had a 473 EEW and a hydrolyzable chloride content of 195 ppm.

EXAMPLE 2

A 0.5-liter flask was charged in order with 237.46 g (1.244 epoxy equivalents) of epoxy resin B, 64.92 g (0.285 mole) of bisphenol A and then heated to about 90° C., whereupon 1.37 g (0.005 mole) of a 44.6 weight percent solution of maleic acid in methanol then 0.47 g (0.0008 mole) of catalyst was added. A nitrogen purge was maintained for the duration of the reaction. The reaction temperature was increased to about 155° C. and maintained until the reaction was completed or about 1.13 hrs. (4068 s). The resultant product had a 463 EEW and a hydrolyzable chloride content of 125 ppm.

COMPARATIVE EXPERIMENT C

A 0.5-liter flask was charged in order with 233.92 g (1.225 epoxy equivalents) of epoxy resin B, 66.08 g (0.289 mole) of bisphenol A and then heated to about 90° C. whereupon 0.43 g (0.0007 mole) of catalyst was added. A nitrogen purge was maintained for the duration of the reaction. The reaction temperature was increased to about 130° C. and maintained for 3.2 hrs. (11,520 s). The results are shown below.

| Time, (Hrs./Secs.) | EEW | Hydrolyzabe Chloride, ppm |
|---|---|---|
| 0.9/3,240 | 498 | 207 |
| 2.0/7,200 | 533 | 258 |
| 3.2/11,520 | 546 | 285 |

EXAMPLE 3

A 0.5-liter flask was charged in order with 237.46 g (1.244 epoxy equivalents) of epoxy resin B, 64.92 g (0.285 mole) of bisphenol A and then heated to about 90° C., whereupon 1.31 g (0.005 mole) of a 44.6 weight percent solution of maleic acid in methanol then 0.42 g (0.0007 mole) of catalyst was added. A nitrogen purge was maintained for the duration of the reaction. The reaction temperature was increased to about 130° C. and maintained for 2.45 hrs. (8820 s). The results are shown below.

| Time, (Hrs./Secs.) | EEW | Hydrolyzable Chloride, ppm |
|---|---|---|
| 0.78/2808 | 457 | 128 |
| 1.87/6732 | 460 | 128 |
| 2.45/8820 | 461 | 130 |

EXAMPLE 4

A 0.5-liter flask was charged in order with 237.46 g (1.244 epoxy equivalents) of epoxy resin B, 64.92 g (0.285 mole) of bisphenol A and then heated to about 90° C., whereupon 0.51 g of maleic anhydride (0.0052 mole) then 0.43 g (0.0007 mole) of catalyst was added. A nitrogen purge was maintained for the duration of the reaction. The reaction temperature was increased to about 155° C. and maintained until the reaction was completed or about 1.00 hr. (3600 s). The resultant product had a 459 EEW and a hydrolyzable chloride content of 113 ppm.

EXAMPLE 5

A 0.5-liter flask was charged in order with 237.46 g (1.244 epoxy equivalents) of epoxy resin B, 64.92 g(0.285 mole) of bisphenol A, 1.38 g of isopropenyl phenol dimer (0.0054 mole) heated to about 92° C. then 0.43 g (0.0007 mole) of catalyst was added. A nitrogen purge was maintained for the duration of the reaction. The reaction temperature was increased to about 155° C. and maintained until the reaction was completed or about 1.25 hrs. (4500 s). The resultant product had a 470 EEW and a hydrolyzable chloride content of 176 ppm.

EXAMPLE 6

A 0.5-liter flask was charged in order with 237.46 g (1.244 epoxy equivalents) of epoxy resin B, 64.92 g (0.285 mole) of bisphenol A and then heated to about 70° C., whereupon 0.54 g (0.0055 mole) of trans-3-hexene-1-ol was added at 93° C., 0.46 g (0.0008 mole) of catalyst was added. A nitrogen purge was maintained for the duration of the reaction. The reaction temperature was increased to about 155° C. and maintained until the reaction was completed or about 1.3 hrs. (4680 s). The resultant produot had a 490 EEW and a hydrolyzable chloride content of 127 ppm.

EXAMPLE 7

A 0.5-liter flask was charged in order with 237.46 g (1.244 epoxy equivalents) of epoxy resin B, 64.92 g (0.285 mole) of bisphenol A and then heated to about 72° C., whereupon 0.46 g (0.0053 mole) of vinylacetic acid was added and at 90° C., 0.46 g (0.0008 mole) of catalyst was added. A nitrogen purge was maintained for the duration of the reaction. The reaction temperature was increased to about 151° C. and maintained until the reaction was completed or about 1.17 hrs. (4212 s). The resultant product had a 461 EEW and a hydrolyzable chloride content of 142 ppm.

EXAMPLE 8

A 0.5-liter flask was charged in order with 237.46 g (1.244 epoxy equivalents) of epoxy resin B, 64.92 g (0.285 mole) of bisphenol A and then heated to about 70° C., whereupon 0.60 g (0.0053 mole) of trans-3-hexenoic acid was added and at 90° C., 0.46 g (0.0008 mole) of catalyst was added. A nitrogen purge was maintained for the duration of the reaction. The reaction temperature was increased to about 150° C. and maintained until the reaction was completed or about 1.17 hrs. (4212 s). The resultant product had a 469 EEW and a hydrolyzable chloride content of 171 ppm.

EXAMPLE 9

A 0.5-liter flask was charged in order with 237.46 g (1.244 epoxy equivalents) of epoxy resin B, 64.92 g (0.285 mole) of bisphenol A and then heated to about 70° C., whereupon 0.71 g (0.0053 mole) of 2-allyl phenol was added and at 90° C., 0.46 g (0.0008 mole) of catalyst was added. A nitrogen purge was maintained for the duration of the reaction. The reaction temperature was increased to about 148° C. and maintained until the reaction was completed or about 1 hr. (3600 s). The resultant product had a 458 EEW and a hydrolyzable chloride content of 137 ppm.

EXAMPLE 10

A 0.5-liter flask was charged in order with 237.46 g (1.244 epoxy equivalents) of epoxy resin B, 64.92 g (0.285 mole) of bisphenol A and then heated to about 70° C., whereupon 0.79 g (0.0055 mole) of hydromuconic acid was added. At 90° C., 0.47 g (0.0008 mole) of catalyst was added. A nitrogen purge was maintained for the duration of the reaction. The reaction temperature was increased to about 150° C. and maintained until the reaction was completed or about 1 hr. (3600 s). The resultant product had a 460 EEW and a hydrolyzable chloride content of 133 ppm.

We claim:

1. In a process for preparing relatively high molecular weight epoxy resins by reacting at least one relatively low molecular weight epoxy resin with at least one polyhydric phenolic compound in the presence of a suitable advancement catalyst; the improvement which comprises also conducting the reaction in the presence of an effective quantity of at least one organic unsaturated compound so as to reduce the hydrolyzable halide content in the resultant relatively high molecular weight epoxy resin and/or prevent increases in the EEW of the advanced epoxy resin while held at elevated temperatures.

2. A process of claim 1 wherein
   (a) said low molecular weight epoxy resin is a diglycidyl ether of a dihydric phenol or polyglycidyl ether of a polyhydric phenol;
   (b) said polyhydric phenolic compound is a dihydric phenol; and
   (c) said organic unsaturated compound is at least one unsaturated aliphatic hydrocarbon, cycloaliphatic hydrocarbon, aromatic hydrocarbon having at least one unsaturated aliphatic substituent, alcohol, ketone, aldehyde, carboxylic acid, anhydride, ester, sulfide, mercaptan, ether, nitrile or mixture thereof.

3. A process of claim 2 wherein
   (a) said low molecular weight epoxy resin is a diglycidyl ether of a bisphenol;
   (b) said polyhdyric phenolic compound is a bisphenol; and
   (c) said organic unsaturated compound is a carboxylic acid having from about 4 to about 10 carbon atoms, a carboxylic acid anhydride having from about 4 to about 10 carbon atoms or a mixture thereof.

4. A process of claim 3 wherein
   (a) said epoxy resin is a diglycidyl ether of bisphenol A, a diglycidyl ether of tetrabromobisphenol A or a mixture thereof;
   (b) said polyhydric phenolic compound is bisphenol A or tetrabromobisphenol A; and
   (c) said organic unsaturated compound is maleic acid or maleic anhydride.

5. A process of claim 1 wherein
   (a) said catalyst is employed in a quantity of from about 0.0003 to about 0.01 mole of catalyst per epoxide equivalent of the relatively low molecular weight epoxy resin;
   (b) said organic unsaturated compound is employed in a quantity which provides from about 0.001 to about 0.007 mole of unsaturated compound per epoxide equivalent contained in said relatively low molecular weight epoxide resin; and
   (c) said catalyst is a phosphonium compound.

6. A process of claim 5 wherein
   (a) said catalyst is employed in a quantity of from about 0.0005 to about 0.001 mole of catalyst per epoxide equivalent of the relatively low molecular weight epoxy resin;
   (b) said organic unsaturated compound is employed in a quantity which provides from about 0.002 to about 0.006 mole of organic unsaturated compound per epoxide equivalent contained in said relatively low molecular weight epoxy resin.

7. A process of claim 2
   (a) said catalyst is employed in a quantity of from about 0.0003 to about 0.01 mole of catalyst per epoxide equivalent of the relatively low molecular weight epoxy resin;
   (b) said organic unsaturated compound is employed in a quantity which provides from about 0.001 to about 0.007 mole of unsaturated compound per epoxide equivalent contained in said relatively low molecular weight epoxide resin; and
   (c) said catalyst is a phosphonium compound.

8. A process of claim 7 wherein
   (a) said catalyst is employed in a quantity of from about 0.0005 to about 0.001 mole of catalyst per epoxide equivalent of the relatively low molecular weight epoxy resin;
   (b) said organic unsaturated compound is employed in a quantity which provides from about 0.002 to about 0.006 mole of organic unsaturated compound per epoxide equivalent contained in said relatively low molecular weight epoxy resin.

9. A process of claim 3 wherein
   (a) said catalyst is employed in a quantity of from about 0.0003 to about 0.01 mole of catalyst per epoxide equivalent of the relatively low molecular weight epoxy resin;
   (b) said organic unsaturated compound is employed in a quantity which provides from about 0.001 to about 0.007 mole of unsaturated compound per epoxide equivalent contained in said relatively low molecular weight epoxide resin; and
   (c) said catalyst is a phosphonium compound.

10. A process of claim 9 wherein
    (a) said catalyst is employed in a quantity of from about 0.0005 to about 0.001 mole of catalyst per epoxide equivalent of the relatively low molecular weight epoxy resin;
    (b) said organic unsaturated compound is employed in a quantity which provides from about 0.002 to about 0.006 mole of organic unsaturated compound per epoxide equivalent contained in said relatively low molecular weight epoxy resin.

11. A process of claim 4 wherein
    (a) said catalyst is employed in a quantity of from about 0.0003 to about 0.01 mole of catalyst per epoxide equivalent of the relatively low molecular weight epoxy resin;

(b) said organic unsaturated compound is employed in a quantity which provides from about 0.001 to about 0.007 mole of unsaturated compound per epoxide equivalent contained in said relatively low molecular weight epoxide resin; and
(c) said catalyst is a phosphonium compound.

12. A process of claim 11 wherein
(a) said catalyst is employed in a quantity of from about 0.0005 to about 0.001 mole of catalyst per epoxide equivalent of the relatively low molecular weight epoxy resin;
(b) said organic unsaturated compound is employed in a quantity which provides from about 0.002 to about 0.006 mole of organic unsaturated compound per epoxide equivalent contained in said relatively low molecular weight epoxy resin.

* * * * *